June 3, 1952 S. E. WINDER 2,598,955
GUIDE TUBE MECHANISM FOR GLASS MACHINERY
Filed Aug. 5, 1946 4 Sheets-Sheet 4
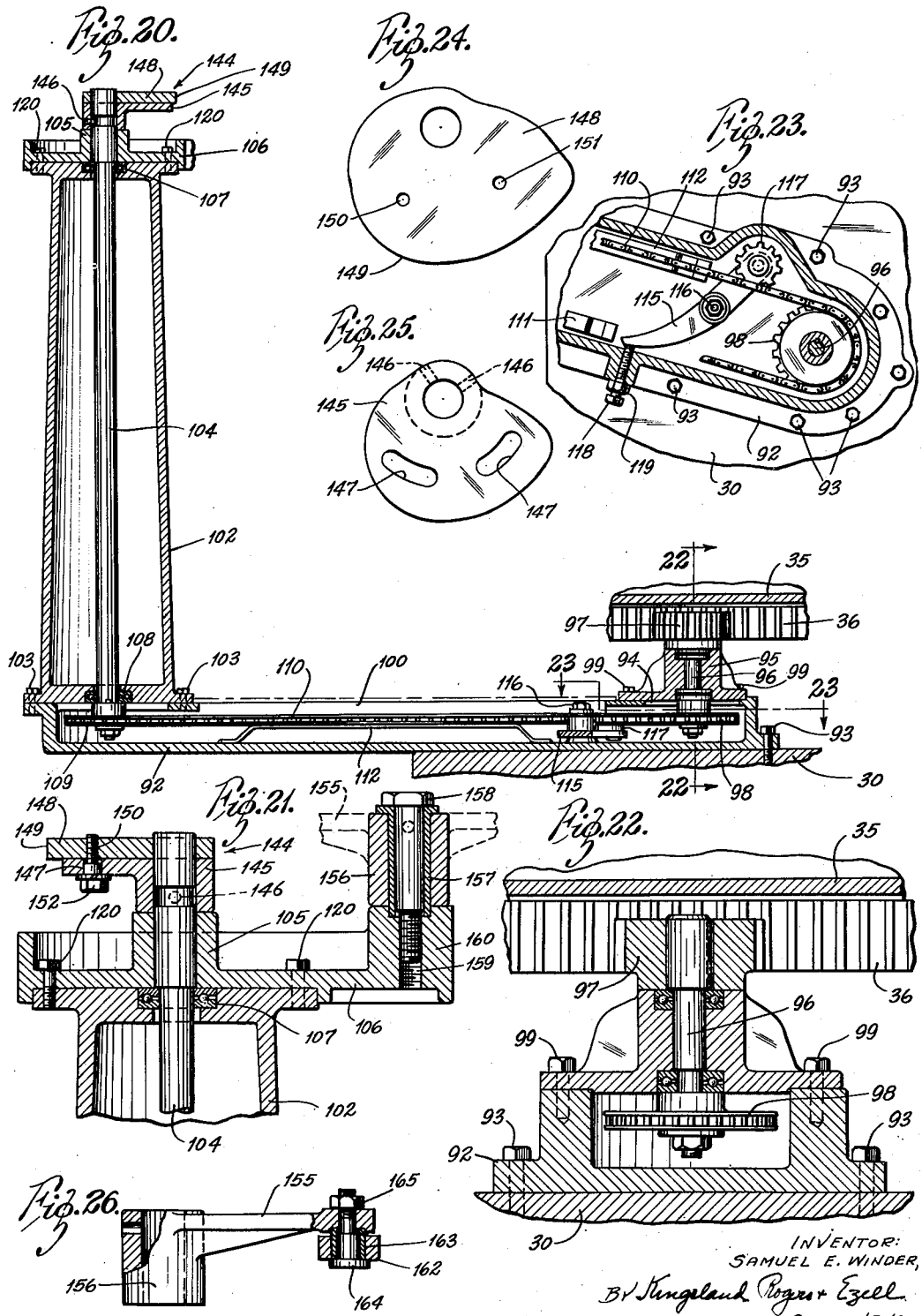
INVENTOR:
SAMUEL E. WINDER,
BY Kingsland Rogers & Ezell
ATTORNEYS.

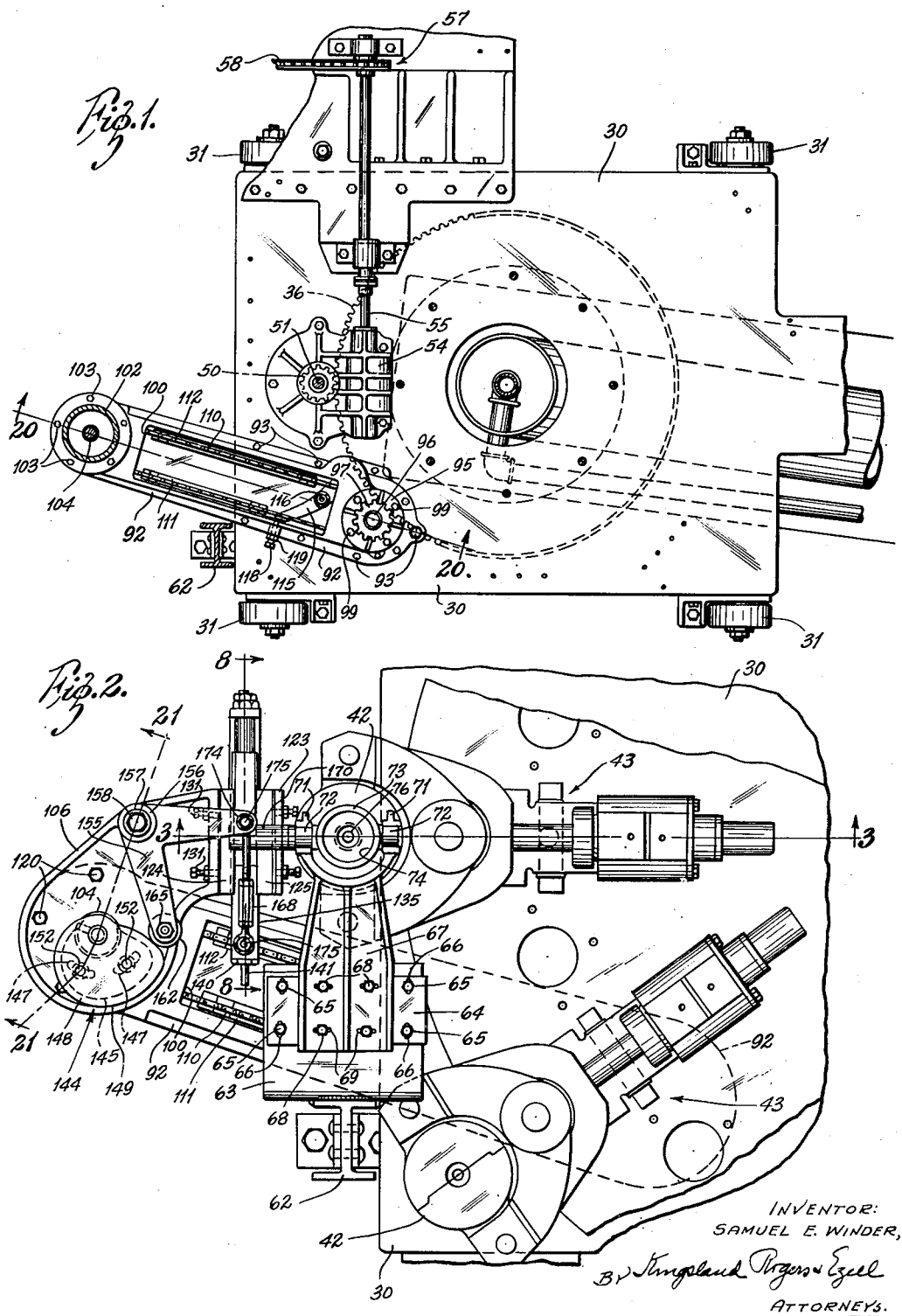

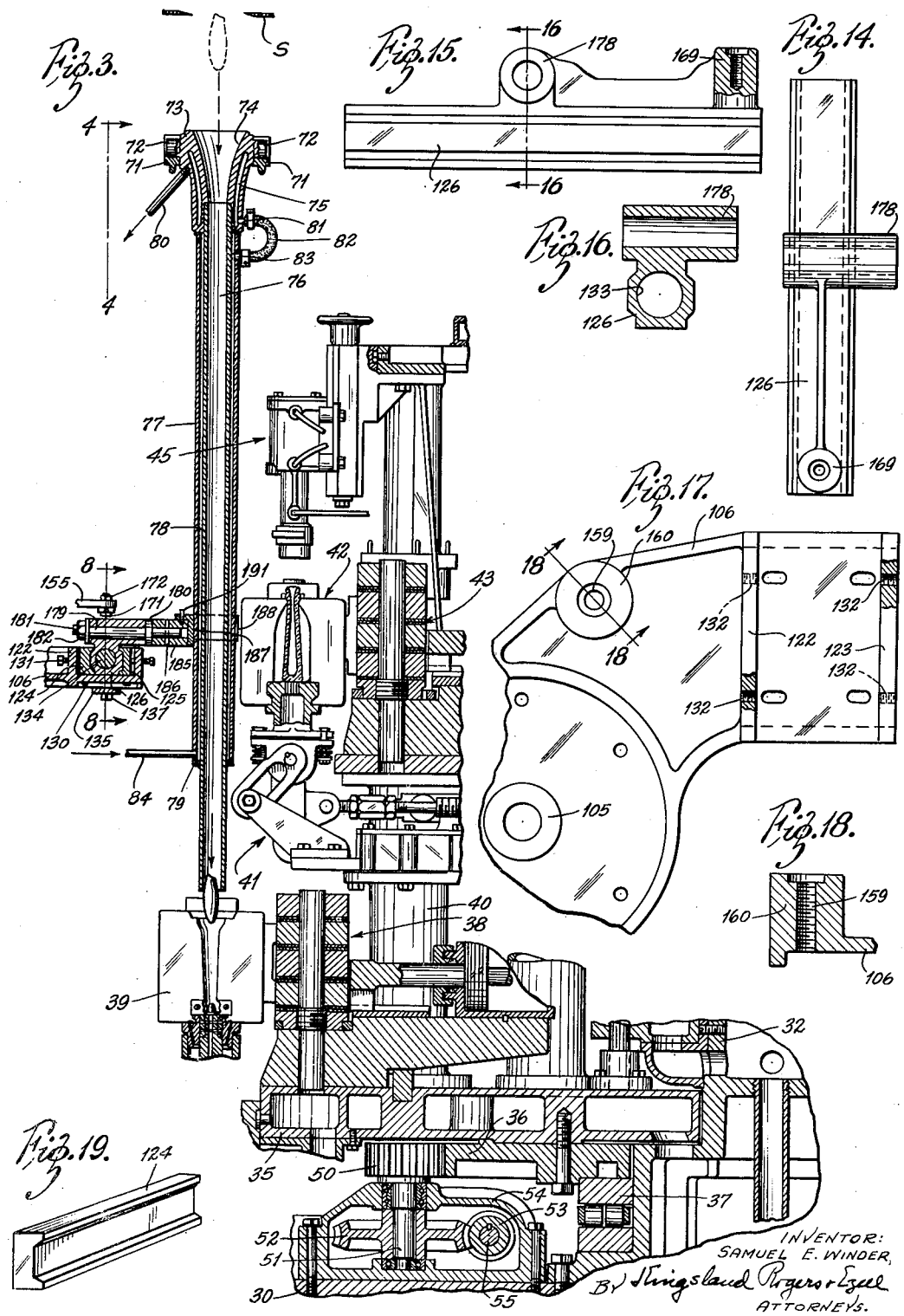

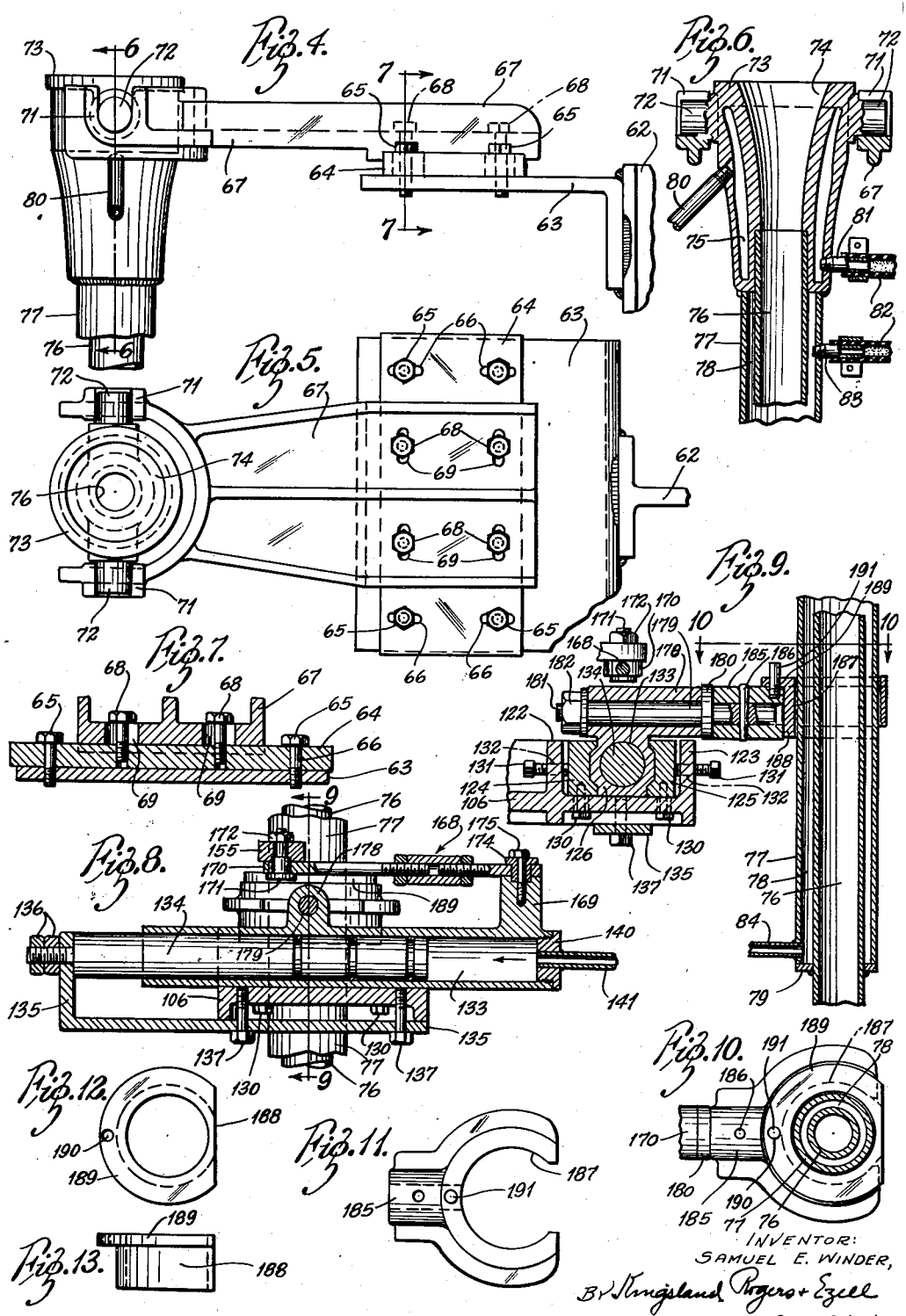

Patented June 3, 1952

2,598,955

UNITED STATES PATENT OFFICE 2,598,955

GUIDE TUBE MECHANISM FOR GLASS MACHINERY

Samuel E. Winder, Knox, Pa., assignor of one-half to Henry C. Daubenspeck, Massillon, Ohio Application August 5, 1946, Serial No. 688,471

28 Claims. (Cl. 49—14)

1

The present invention relates to a guide tube mechanism for glass machinery. More particularly, it relates to a guide tube to be interposed between a glass feeder and a glass forming machine, with mechanism to move the guide tube so that it will discharge a mass of glass released from the feeder into a moving mold of the glass forming machine.

A particular object of the invention is to provide a guide between a fixed glass discharge point and a movable glass receiving mold that will receive the glass from the discharge point, convey it to the mold, and give it lateral components of motion that cause it to descend cleanly into the mold. It is another object to accomplish the above without detrimental interference with the downward velocity of the glass. A further object is to arrange the guide tube, and to move it so that the tail end of a gob of glass is delivered into the mold without lapping.

Stated somewhat differently, it is an object of the invention to impart to a gob of glass descending by gravity from a fixed feeder to a moving mold lateral motion components as nearly as possible identical with the lateral motion of the moving mold, so that the vertical movement of the gob will cause it to descend cleanly into the mold cavity.

It is an object of the invention to provide a tube of the foregoing kind, which is arranged to receive glass discharged by a glass feeder, and to convey the glass to the moving mold, by establishing a coordinating movement of the tube with the mold.

A further object of the invention is to provide such a tube that swings on an axis that permits movement of one end of the tube with the mold, as the latter moves, together with means synchronized with the movement of the mold to cause the lower end of the tube to follow the movement of the mold.

A specific object of the invention is to provide a glass receiving tube of the foregoing kind that is suspended for pivotal movement at its upper end adjacent the feeder discharge outlet, with its lower end disposed adjacent the path of a moving mold into which the glass is to be deposited, with means engaging the tube to swing it so that its lower end substantially follows the movement of the mold adjacent the charging point thereof. A particular object is to give the lower end of the tube, as aforesaid, a reciprocating movement that is tangential to the circle through which the mold moves, so that for all practical purposes the lower end of the tube is picked up to follow the movement of the mold across the charging point thereof.

Further specific objects are to provide simple and accurately operating mechanism to accomplish the foregoing movements. Further objects include the provision of adjustment means necessary to obtain the proper coordination of the parts.

2

In the drawings:

Fig. 1 is a plan view of a glass forming machine base, with its driving mechanism, showing the driving mechanism for the guide tube mechanism attached thereto;

Fig. 2 is a top plan view of the guide tube mechanism attached to the forming machine;

Fig. 3 is a radial section through the forming machine and the guide tube mechanism, taken on the line 3—3 of Fig. 2, and showing the shears associated with the feeding means above the top of the tube;

Fig. 4 is a side view of the top of the guide tube mechanism, taken from the points 4—4 of Fig. 3;

Fig. 5 is a top view of the parts shown in Fig. 4, comprising the bracket for supporting the guide tube;

Fig. 6 is a vertical section through the top of the guide tube, taken on the line 6—6 of Fig. 4;

Fig. 7 is a vertical section through the adjustable bracket support, taken on the line 7—7 of Fig. 4;

Fig. 8 is a section longitudinally through the reciprocating driving means, taken on the line 8—8 of Figs. 2 and 3;

Fig. 9 is a section taken on the line 9—9 through the middle of Fig. 8;

Fig. 10 is a horizontal section taken on the line 10—10 of Fig. 9;

Fig. 11 is a view of the sleeve holding fork of the reciprocating mechanism;

Fig. 12 is a plan view of the sleeve that fits over the guide tube and into the fork of Fig. 11;

Fig. 13 is a side elevation of the sleeve shown in Fig. 12;

Fig. 14 is a plan view of the reciprocating crosshead sleeve;

Fig. 15 is a front elevation thereof;

Fig. 16 is a transverse section on the line 16—16 of Fig. 15 through the crosshead sleeve;

Fig. 17 is a fragmentary view of the bracket upon which the reciprocating mechanism is mounted;

Fig. 18 is a section on the line 18—18 of Fig. 17, showing the mounting for the bell crank actuating arm;

Fig. 19 is a perspective view of one of the slide tracks;

Fig. 20 is a section on the line 20—20 of Fig. 1, taken through the supporting column for the swinging mechanism;

Fig. 21 is a section through the upper part of the column, taken on the line 21—21 of Fig. 2;

Fig. 22 is a section on the line 22—22 of Fig. 20, showing the drive mechanism;

Fig. 23 is a horizontal section on the line 23—23 of Fig. 20, showing part of the drive mechanism, and particularly the chain tightener;

Fig. 24 is a top view of one of the cam elements;

Fig. 25 is a similar view of the second element; and

Fig. 26 is a view partly in section of the bell crank operating lever.

The mechanism includes a base 30, which is here shown as supported on wheels 31. This base has a center column, shown in fragment in Fig. 3 at 32, about which various operating parts are caused to rotate. There is a rotating table 35 that is attached to a large gear 36 (Figs. 1 and 3). The gear 36, in turn, is supported upon a bearing 37, so that the table 35 is rotatably supported on the base 30 and the column 32. The table 35, in turn, supports blank mold mechanisms, generally indicated at 38, and including blank molds 39 arranged around its periphery. The table also, through means of columns 40, supports transfer mechanisms, generally indicated at 41, by means of which formed parisons of glass may be transferred from their blank molds 39 to finish molds, generally indicated at 42, and constituting parts of blow mold mechanisms 43 supported on the columns 40, and finally supported upon the table 35 and the base 30. Above each finish mold 42, there is a blow head mechanism, generally indicated at 45, for finally completing the parison into the shape of the finished ware in the finish mold.

The foregoing mold parts are shown here only to represent one installation with which the present invention will readily cooperate. In detail, these forming machine elements and their combinations form part of a separate application by this inventor.

The large gear 36 is caused to rotate by a driving mechanism comprising a driving gear 50 supported upon a shaft 51, mounted upon the base 30 in vertical position. This shaft 51 supports a worm wheel 52 that is rotated by a worm 53 mounted in a gear box 54, along with the shaft 51 and the worm wheel 52. The worm wheel 53 is keyed to a shaft 55 that extends outwardly from the box 54 through a suitable coupling to a drive mechanism 57, here shown as being a chain and sprocket drive, the chain 58 being driven by a suitable power means not shown.

At some suitable point, preferably on the base of the forming machine, there is a support means, here shown in the form of a supporting beam 62, that projects upwardly. At its upper end, the beam or column 62 supports an angle member 63 that forms a ledge. This ledge, in turn, receives a pad 64 that is attached thereto by screws 65. The pad has slots 66, through which the screws 65 extend. By this arrangement, the pad may be moved toward or away from the beam 62 and then tightened securely into position. The pad 64, in turn, supports a bracket arm 67 by screws 68. These screws 68 pass through slots 69 in the attached end of the bracket arm 67. It will be seen that the slots 66 and the slots 69 extend at right angles to each other. Hence, the arrangement affords universal adjustment of the supporting arm 67. This arm engages over the edges of the pad 64 to increase its security and render its attachment and adjustment easier.

The supporting arm 67 projects outwardly from the I-beam column 62 and has diametrically opposite cradle bearings 71 formed thereon. These, in turn, receive trunnions 72 that extend from the opposite side of a tubehead member 73. This tubehead member tapers outwardly toward its top, providing a glass receiving opening 74. It has likewise a cooling chamber 75 in it, as shown. At its lower end, it receives an inner glass receiving tube 76 that is fixedly attached to it. It also receives an outer tube 77 that is spaced from the inner tube 76 to provide a cooling chamber 78 between them. The tube 77 need not extend to the bottom of the inner tube 76, but may terminate short thereof in the bottom part 79 that provides a tight seal between the two tubes.

A water line 80 leads into the chamber 75 in the tubehead 73. A water line 81 leads from this chamber at the bottom thereof, and is connected by a flexible connection 82 to a line 83 connected into the chamber 78 between the two tubes 76 and 77 at their tops. A flexible water line 84 leads from the bottom of the cooling chamber 78. The line 84 is preferably connected as an inlet to a water supply. The line 80 comprises the outlet. Such connection assures that the chambers 78 and 75 will remain full of water even when the supply is cut off.

The head 73 is located to dispose its opening 74 beneath the feeder opening and below the shears S (Fig. 3), which are usually supplied to sever the glass discharged by the feeder. The glass is shown in dotted lines leading to the head 73 of the tube. The lower part of the tube 76 is disposed adjacent the inlet opening at the top of one of the blank molds 39. The trunnions 72 are arranged on an axis that is parallel to a radius of the rotating table 35. Hence, the tube may rock in a direction tangential to the circle of rotation of the mold.

Near the lower left corner of the base, as it appears in Fig. 1, there is located the driving mechanism for the guide tube arrangement. A supporting bracket 92, in the form of a channel-shaped arm, is fastened by screws 93 to the top of the base 30. This supporting bracket 92 has a web across its top at its inner end providing an opening 94 to receive a sprocket wheel, as will appear. This end also receives a cover or housing 95, in which a short vertical shaft 96 is duly supported. At its upper end, this shaft receives a gear wheel 97 that meshes with the large gear 36 of the forming machine, so as to be driven thereby. As a result, the rotation of the gear 97 causes rotation of the shaft 96.

This shaft 96, at its lower end, supports a sprocket wheel 98 that may be inserted down through the hole 94 in the channel-shaped bracket 92. It will be seen that the housing 95, the shaft 96, the gear 97, and the sprocket wheel 98 may be assembled as a single convenient unit, and then attached to the top of the bracket 92 by suitable screws 99.

The channel-shaped member is provided in its top part with a long rectangular opening 100 that may receive a cover plate (not shown). At its outer end, it is closed across the top and is shaped to receive a hollow, somewhat tapering column 102 that is screwed thereto by screws 103. This column may be closed over at its top and bottom to provide support for a vertical driving shaft 104. This driving shaft may be inserted through a hub 105 on the base end of a projecting arm 106. It projects above the top of the hub, but has a shoulder adjacent the bottom of the hub which engages with a bearing 107 at the top of the column 102, thus giving the shaft vertical support.

At its bottom end, the shaft passes through a bearing 108 and projects into the channel-shaped supporting bracket 92. In this base, it has mounted on it a sprocket wheel 109 which is driven by the previously mentioned sprocket wheel 98 through the medium of a sprocket chain 110. The sprocket chain spans may be supported by suitable supports 111 and 112.

The sprocket is provided with a tightening means in the form of a lever 115, pivotally mounted at 116 onto the bottom of the bracket 92. This arm supports an idler sprocket wheel 117 that fits in a suitable bulge on the channel-shaped member and bears against the outer side of the sprocket chain 110 near the sprocket wheel 98. The other end of the arm 115 extends across to the other side of the channel-shaped bracket 92 below the chain, and is engageable by a suitable adjusting screw 118 that has a lock nut 119 to keep it in adjusted position. It will be seen that adjusting the screw 118 will adjust the tension on the sprocket chain 110.

The column 102 extends upwardly to a point below the trunnions 71. This distance is here shown as about two-thirds of the distance down the feeding tube. At its top, the column 102 supports, by screws 120, the previously mentioned bracket arm 106, the shape of which is clearly shown in Figs. 2 and 17. It will be seen from Fig. 20 that the arm has a cylindrical flange that extends down over a circular flange on the top of the column, this adding to the stability of the mounting.

The arm 106 extends around to a point adjacent the depending tube. At its outer end, it is provided with two vertical flange walls 122 and 123 that are spaced from each other. These two walls receive two opposed track members 124 and 125 that may be flat on their back surfaces adjacent the flanges, but which have grooves on their facing surfaces. The grooved facing surfaces receive between them a complementarily shaped reciprocating slide member 126, which has projections that engage with the aforesaid grooves in the two track members, whereby it is confined to reciprocating movement. This reciprocating movement is in a direction normal to a radius from the center column 32 of the forming machine.

The two tracks 124 and 125 are held onto the arm 106 by screws 130 that pass through slots in the member 106. There are adjusting screws 131 engaged in holes 132 through the two flanges 122 and 123 to engage the back sides of the two track members. The attachment screws 130 may be loosened sufficiently to permit the screws 131 to be adjusted, thereby to adjust the reciprocating slide in a direction transversely of its direction of reciprocation, and enable proper alignment of the rocking mechanism with the tube to be made.

The slide 126 has a cylindrical opening 133 from end to end thereof. This cylindrical opening 133 receives a fixed piston 134 that extends beyond the sleeve 126 and is held to an upstanding end on an L-shaped bracket 135. There are suitable nuts 136 that engage over a threaded extension on the end of the piston 134 for the foregoing purpose. The bracket 135 extends downwardly below the arm 106 and is held thereto by screws 137. The piston 134 engages the cylindrical opening 133 for pneumatic operation therein.

The end of the cylindrical bore 133 is closed by a threaded cap 140 that has an air line 141 leading thereinto. Air pressure thereby may act upon the end of the piston 134, constantly urging the slide 126 to move a maximum distance to the right in Fig. 8.

The driving means for moving the sleeve in the other direction consists of a cam and rocker arm arrangement driven from the driving sprocket mechanism and the vertical shaft 104 extending upwardly in the column 102. Above the supporting arm 106, where it is mounted on the column, the shaft 104 projects outwardly and receives a composite cam, generally indicated at 144. This cam, as shown in Figs. 20, 24 and 25, includes a lower member 145 that is engaged over the shaft 74 and is locked thereto by set-screws 146. This cam member 145 has arcuate slots 147 therein. It receives an upper cam member 148 that has a cam edge 149 designed for producing the movement desired. This upper cam member 148 receives screws through openings 150 and 151. Such screws are indicated at 152 in Fig. 21. It will be seen that these screws may be loosened, and thereby the upper cam member 148 adjsted on the lower cam member within the limit afforded by the engagement of the screws 152 through the slots 147.

The upper cam member 148 is designed to engage a roller on one end of a bell crank 155. This bell crank 155 has a hub 156 that receives a flanged bearing liner 157, that in turn receives a stud 158 (Fig. 21), the lower end of which is of reduced diameter to thread into a threaded opening 159 in a boss 160 formed on the arm 106. The arrangement provides for free rocking of the bell crank 155.

The cam end of the bell crank receives a roller 162 that is supported about a bearing sleeve 163. This latter is held to the lower side of the bell crank arm by a screw 164 that has a flanged head and which fits up through the bell crank arm and is engaged by a nut 165, as shown in Fig. 26.

The other end of the bell crank 155 is connected by a turnbuckle arrangement, generally indicated at 168, to an upstanding lug 169 on the sleeve 126. This turnbuckle mechanism 168 has an eye 170 at its end adjacent the bell crank, which eye receives a screw 171 that projects upwardly through the bell crank arm and is held by a nut 172. This attachment is such as to prevent binding of the turnbuckle and bell crank.

The other end of the turnbuckle arrangement has an eye that fits over a bearing collar 174 and is held thereto by a screw 175 passing into the upstanding lug 169.

As the cam 144 rotates, the bell crank 155 will be rocked. In so rocking, it will, through the turnbuckle mechanism, cause reciprocation of the sleeve 126 against the compression of the air in the cylinder 133. The pivotal disposition of the turnbuckle arrangement permits this arcuate movement of the bell crank lever arm to be changed to reciprocating movement of the slide 126.

The cylindrical slide 126 has a transverse shaft bearing 178 arranged in a direction at right angles to the reciprocation. This bearing receives a shaft 179 that is flanged at 180, so as to limit its movement toward the sleeve. At its other end, it has a reduced threaded portion 181 that receives a nut 182 in such way that free bearing and rocking of the shaft 179 in the bearing 178 is provided.

Beyond the flange 180, the shaft 179 is reduced and fits into a bore in a yoke member 185, which yoke member is shown alone in Fig. 11. A pin 186, preferably tapered so that it will be securely held but may be removed, passes down through suitable openings in the hub of the yoke member 185 and the projection of the shaft 179, so that the yoke is securely attached to the shaft 179 and will rotate therewith.

The yoke has two arms having an arcuate inner surface 187. This arcuate surface is designed to receive a sleeve member 188 which is flanged around most of its upper edge, as shown at 189, so that it may be readily slipped down into the arcuate opening 187 and will be held by the engagement of the flange onto the arms of the yoke member. It is held against rotation by having a hole 190 that fits freely over the top of a pin 191 that is threaded into the yoke member, as shown in Fig. 9.

The collar 188 receives the outer tube 77 for free sliding movement therein. As the sleeve 126 is reciprocated, the shaft 179 is moved from side to side transversely of its axis. The collar 188 engages over the tube 77 and causes the same to rock about its trunnions 72. In this rocking movement, the collar is itself caused to rock about the shaft 179.

Operation

As has already been set forth, the several molds 39 are arranged around the table 35 and rotate clockwise in Figs. 1 and 2 about the center column of the machine which is concentric with the large gear 36. These molds are on a continuously rotating base, as the present mechanism has particular utility with continuous machines. The discharge point of the feeder is disposed as nearly as may be directly over one of the molds 39 at a charging point in the rotation of the machine. Consequently, successive molds are brought under the outlet opening of the feeder. However, it is necessary for the most successful operation to guide the charge of glass as it falls by gravity from the feeder into this particular mold. This guiding is the function of the present tube.

The ultimate purpose of the guide tube is to receive a gob of glass from the fixed feeder outlet, and guide its gravity descent in such wise that its lateral travel, when delivered to the mold, is the same as the lateral travel of the mold itself. When this is done, the vertical component of movement of the mold will cause it to drop cleanly into the mold, without overlap of the tail of the gob, and without engagement of the upper part of the mold by the tail of the gob.

It is necessary to control the foregoing movement of the gob. It has been found by the applicant that the imparting to the gob of a lateral component of movement must be made gradually in order to avoid decelerating the vertical travel. Also, a sudden lateral deflection tends to produce relatively severe engagement of the side of the gob by the guide means, and deformation thereof. Finally, its discharge direction from the guide is not as nearly coincident with the lateral movement of the mold.

With the present guide tube, the receiving end has a minimum of movement, owing to the high disposition of the tubehead adjacent the shears. The mouth 74 of the tube has a gradual slope that will receive the gob despite misalignments such as those caused by the shears. The gob is not materially slowed down in its vertical movement.

The lower end of the tube has movement consisting of a rapid forward increment caused by the portion of the cam edge shown in Fig. 2 as engaged by the roller 162. This increment is that in which the lower end of the tube is advancing with the mold. Thereafter, when the roller rides over onto the outer edge of the cam, a slow return of the tube end takes place, bringing it to a point in advance of the mold charging point.

The gob may be introduced into the tube when the lower end of the tube is either discharging a previous gob, or thereafter, depending upon the factors influencing the travel of the gob, and upon the speed of the forming machine. In general, lighter gobs are sheared earlier. The minimum movement of the upper end of the tube prevents harm to the new gob by rapid movement of the lower end. When the gob is down into the tube, the lateral movement is slow, so that the downward travel is not disadvantageously hindered by forceful contact with the walls of the tube. As the gob enters the lower end of the tube, the latter is caused to swing rapidly with the tube in lateral direction according with the movement of the mold. Discharge from the tube into the mold takes place with the mold cavity preferably vertically below the feeder orifice. When the gob leaves the tube, it is traveling in a downward and lateral manner, with its axis substantially coinciding with the axis of the mold cavity. It, therefore, moves cleanly into the mold, and, despite movement of the latter, does not have deleterious engagement with the sides or the top of the mold, and does not have overlap of the tail.

It is thus evident that, to perform the foregoing, the apparatus must have careful synchronization with the forming machine. The mechanical arrangement will now be described.

The column 62 will dispose the tubehead 73 so that its opening 74 is directly below the discharge point from the feeder and directly below the shearing point of the shears S, and preferably as close thereto as practicable. In order to obtain accurate disposition of the tubehead, the screws 65 and 68 may be loosened, so that the supporting arm 67 may be adjusted laterally or back and forth to obtain proper location of the tubehead. After the adjustment is obtained, the screws 65 and 68 may be tightened and the tubehead will be held in proper position.

As the tubehead 73 is supported on the trunnion 72, it will be capable of a swinging movement, by which its lower end may move back and forth in a direction tangential to the radius of the forming machine at the particular mold passing the charging point. The disposition of the trunnions at the top of the tube eliminates any substantial movement from the tubehead, despite extensive swinging of the bottom. The gob is, therefore, received without immediate displacement, and may fall easily into the tube.

The present mechanism causes this swinging movement to take place in synchronization with the travel of the mold. The shaft 104 in the column 102 is caused to rotate by the same large gear 36 that causes the molds to rotate about their axes. The gears and sprockets are so sized that the shaft 104 will make one complete revolution in the time it takes one mold to move from an approach point ahead of the charging position to a point of recession after the charging position, and return for a subsequent mold. The edge of the cam 144 is designed so that at the approach point the roller 162 on the bell crank 155 will be at its most inward position toward the axis of the cam. There may be a dwell at this point. Then, in proper time to arrive at the center position with the mold, the bell crank will be moved rapidly counterclockwise, moving the slide 126 upwardly in Fig. 2, which will cause the lower end of the tube 76 to follow the movement of the mold. As already noted, the feeder should be timed so that the gob will enter the mold when the mold and the tube are aligned axially. The tube will follow the mold beyond the center or delivery point to a maximum point, and, after a dwell there for a very short time, the tube will be caused to return slowly to the approach point for a succeeding mold. It will be understood that the cam rocks the bell crank and the latter displaces the crosshead slide 126 against the force of the air in the cylinder 133.

The adjustment for the disposition of the tubehead, with respect to the feeder, has already been described. The adjustment of the synchronization of the rocking of the tube with the mold travel may be effected by adjusting the upper cam plate 148 over the lower cam element 145. This is accomplished by loosening the screws that hold these parts together and adjusting the upper cam member over the lower one, the adjustment being permitted by the slots 147. Thereafter, the screws may be tightened. This changes the starting point of the swinging movement without changing the over-all cycle.

The position of the tube at the beginning of a cycle may be adjusted by adjusting the turnbuckle 168, which shortens the distance between the end of the bell crank and the slide 126.

The cycle itself may be changed by employing a different cam from that here shown.

Where it is necessary to change the length of the tube, this may be done by inserting a different tube 76 into the tubehead. As an alternative, an entirely new tube may be applied to the machine. The old tube may be withdrawn by lifting it upwardly to disengage its trunnions from their bearings and to slip it out of the collar 188. Thereafter, a new tube with corresponding trunnions may be applied. If the new tube has a different size, a new collar 188 may easily be inserted into the yoke 185, it being dropped thereinto to dispose its hole 190 over the pin 191. It is, of course, necessary to disconnect the cooling water connections 80 and 84 where a new tube is inserted.

The cooling of the tube is desirable, particularly where glass at a high temperature is discharged from the feeder. This eliminates some of the heat that would otherwise have to be absorbed by the mold.

It has been found desirable for best operation to have the "metal line," or height of the liquid glass level in the forehearth, at least ten feet above the mold.

What is claimed is:

1. A unitary guide tube for use with a glass feeder and molding machine wherein the feeder is not moved and the molding machine is moved in a predetermined path and direction, means for supporting the guide tube to dispose one end without substantial movement in a predetermined position, wherein it may receive glass from the feeder, said supporting means having a swinging mounting with a substantially horizontal axis for swinging of the other end of the guide tube in a path that differs from but moves into alignment with the predetermined path aforesaid, and means for moving the said other end in said path for a predetermined distance at predetermined speed, and then for reversing it to its starting position from whence it began its said movement.

2. In a mechanism of the kind described, a movable mold, a guide tube for receiving glass and conducting the same to the mold during its movement, the portion of the tube adjacent the mold being movable in the path of the moving mold, means normally urging the said movable end of the guide tube toward one extreme position, means operated with movement of the mold to displace the said end of the guide tube away from said extreme to follow the movement of the mold, said displacing means including a bracket, means for swinging the bracket, and a collar shaped to slidably engage the tube and readily removable from, but held onto, the bracket and embracing the tube.

3. In a mechanism of the kind described, a mold, and mold moving means, a guide tube for receiving glass and conducting the same to the mold, means supporting the receiving end of the tube against substantial displacement, and the portion of the tube adjacent the mold for movement from outside the path of the mold into said path, means normally urging the said movable end of the guide tube toward one extreme position, and means operated with movement of the mold to displace the said end of the guide tube away from said extreme to follow the movement of the mold, said last-named means comprising a movable driving element for engaging the end of the guide tube, means mounting the driving element for driving movement separate from movement of the mold, and interconnections between the mold moving means and the driving element for moving them individually but in synchronism.

4. A unitary feeder tube for use in conducting glass from a feeder to a mold that moves in a predetermined path at predetermined speed, substantially horizontal pivotal means supporting the upper end of the tube therefor, whereby it may receive glass from the feeder, and for permitting the lower end of the tube to rock in a plane so that the lower end of the tube moves into substantial coincidence with the path aforesaid, and means to rock the lower end of the tube into said path at a speed substantially equal to the said predetermined speed.

5. A feeder tube for use with glass machinery comprising a support, a glass receiving tube, pivot means on the tube, a bracket supporting said pivot means for rocking of the tube substantially in a plane, and means for adjusting the bracket means on the support to adjust the tube properly with respect to the glass machinery, said pivot means on the tube comprising trunnions, and cradle bearings on the bracket in which said trunnions may rest rockably.

6. A feeder tube mechanism for use with glass machinery comprising a tube, means supporting the tube for rocking thereof about a pivot axis in coordination with the movement of a glass receiving mold, said means comprising a reciprocating member, means for causing the reciprocating member to move back and forth in a path transverse to the axis of the tube, means on the reciprocating member to engage the tube and move the same, and means rockably mounting the engaging means on the reciprocating member.

7. A feeder tube mechanism for use with glass machinery comprising a tube, means supporting the tube for rocking thereof about a pivot axis in coordination with the movement of a glass receiving mold, said means comprising a reciprocating member, means for causing the reciprocating member to move back and forth, and means on the reciprocating member to engage the tube and move the same, said last-named means being rockably mounted on the reciprocating member, and comprising a bearing on the reciprocating member, a shaft rockable in said bearing, and a yoke on said shaft and engageable over the tube.

8. A tube for use with glass machinery including a tubehead, a support therefor to dispose the tube in position to receive glass, pivot means between the tubehead and the support for rockably mounting the head on the support, tube means depending from the tubehead, a cooling compartment in the tubehead, a separate cooling compartment around the depending tube, the depending tube being rockable so that it may accord with the movement of a moving mold.

9. A tube for use with glass machinery including a tubehead, a support therefor to dispose the tube in position to receive glass, pivot means between the tubehead and the support for rockably mounting the head on the support, tube means depending from the tubehead, a cooling compartment in the tubehead, a separate cooling compartment around the depending tube, the depending tube being rockable so that it may accord with the movement of a moving mold, said cooling compartments being connected, an inlet to one of them, and an outlet from the other.

10. Guide tube means for glass machinery comprising a glass feeder tube, means for supporting the glass feeder tube for movement of one part thereof to accord with movements of a glass receiving member, and mechanism for moving said part of said glass tube, said mechanism including a reciprocatable member, a support for the reciprocatable member, said support including track means engageable with the reciprocatable member to guide the same in its movements, means for adjusting the reciprocatable member relative to its support in its direction of reciprocation, and means for adjusting the reciprocatable member transversely to its direction of reciprocation.

11. Means for moving a glass feeder tube to accord with the movements of a glass receiving device, including a member movable back and forth, means on the member to engage the tube to move the same, means for moving the member forth and back in a predetermined timed cycle, drive means for operating said last-named means including a drive shaft and means for operating the member at predetermined rotary positions of the drive shaft, and means for adjusting the relationship between the drive means and said last-named means to adjust the position of the drive shaft that effects beginning of the cycle.

12. In glass machinery, an elongated guide tube, pivot means rockably mounting one end of the tube for rocking of the tube about a pivot axis, in a plane, and power means engageable with the tube for moving the other end of the tube in an arcuate path in said plane.

13. In glass machinery, an elongated guide tube, pivot means rockably mounting one end of the tube for rocking of the tube about a pivot axis, in a plane, and power means engageable with the tube for moving the other end of the tube in an arcuate path in said plane, said power means having mechanism to maintain the tube in one position, then rapidly move it toward another position, and finally to return it to its first position.

14. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally, and a connecting element engaging it and the tube, and slidably and rockably mounted on one of them to accommodate angular movement of the tube to horizontal movement of the reciprocating member.

15. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally, and a connecting element engaging it and the tube, and slidably and rockably mounted on one of them to accommodate angular movement of the tube to horizontal movement of the reciprocating member, the connecting element comprising a device interfittable with the tube, and rockable connecting means between it and the reciprocating member.

16. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally, a connecting element engaging it and the tube, and slidably and rockably mounted on one of them to accommodate angular movement of the tube to horizontal movement of the reciprocating member, the connecting element comprising a device interfittable with the tube, rockable connecting means between it and the reciprocating member, and means for attaching the interfittable device with the connecting means for ready removal thereof.

17. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movbale to displace the said lower end in said plane, said power means having a reciprocating member movable horizontally, a connecting element engaging it and the tube, and slidably and rockably mounted on one of them to accommodate angular movement of the tube to horizontal movement of the reciprocating member, the connecting element comprising a device interfittable with the tube, rockable connecting means between it and the reciprocating member, the interfittable member comprising an element embracing the tube, and lug means between it and the rockable connecting means for ready removal of said embracing element.

18. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally in a direction transverse to the pivot axis of the tube, a shaft on the reciprocating member parallel to the pivot axis, a member engaging the tube and mounted on the shaft for rocking about the axis of the shaft when the reciprocating member is moved.

19. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally, and a connecting element engaging the tube, and drive means for moving the reciprocating member including a driving element and a link of adjustable length between the driving element and the reciprocating member.

20. In glass machinery, an elongated guide tube with an upper end adapted to receive charges of glass successively at a fixed point, means supporting the tube at said upper end including pivot means for rocking of the lower end in a plane without displacing the upper end from said point, reciprocating power means engageable with the lower end of the tube and movable to displace the said lower end in said plane, said power means having a reciprocating member movable horizontally, and a connecting element engaging the tube, drive means for moving the reciprocating member including a cam, a cam shaft, a lever rocked by the cam, a link of adjustable length between the lever and the reciprocating member, and means to adjust the position of the cam on the cam shaft.

21. In a glass machine, a base, a main column, a plurality of glass molds rotatable on the base about the axis of the main column, an extension on the base, a reciprocating member operable in a path tangent to the circle of the molds, means supporting the reciprocating member on the extension, means moving the reciprocating member back and forth, a guide tube supported above the reciprocating member for rocking in a plane tangent to the circle of the molds, and means engaging the reciprocating member with the tube for swinging the lower end thereof into intersection with the circle of the molds.

22. A method of feeding glass charges successively from a fixed discharge point to a series of molds rotating about a given vertical axis, including successively discharging charges into a single confining means at such a rate that more than one charge is in the means at one time, holding the upper part of the confining means against lateral displacement to receive the successive charges, displacing the lower end of the confining means with the charge therein, to apply a lateral motion thereto, and delivering the lower charge to the mold with a lateral speed substantially that of the mold.

23. In a glass machine, an upright, elongated guide means for receiving charges of glass from a feeder and delivering the same to an upright mold moving about a vertical axis below the feeder; means for rockably mounting the upper end of the guide means, the guide means having a length to extend into proximity to the mold when aligned with the mold, means for displacing the lower end of the guide means across the top of the mold, in a direction to coincide with the lateral movement of the mold, means for synchronizing the movements of the lower end of the guide means to cause the guide means to drop a charge of glass from its bottom into the top of the mold at the time the bottom of the guide means passes across the top of the mold.

24. The combination of claim 23, wherein the displacing means is separate from but interconnected and synchronized with the mold moving means.

25. A guide tube mechanism for glass machines having molds rotating about a vertical axis, comprising a guide tube having a horizontal pivot mounting at its upper end, whereby it can swing in a vertical plane that is tangent to the plane of the moving molds; mechanism for rocking the lower end of the tube, comprising a support, a piston and cylinder arrangement on the support and chargeable with fluid under pressure to dispose the reciprocable element of said arrangement yieldably to one extreme of its movement, a driving shaft, a cam on the shaft, a cam follower mechanism between said movable element and the cam, so that the cam can displace the movable element against the fluid pressure; a tube engaging means on the movable element for causing the lower end of the tube to swing in its plane, back and forth as determined by the configuration of the cam.

26. The combination of claim 25, wherein the movable element of the piston and cylinder arrangement reciprocates in a direction transverse to the axis of the tube, and parallel to a tangent to the arc of movement of the molds.

27. The combination of claim 25, wherein there is a means for adjustment of the cam relatively to the driving shaft to vary the timing of the tube with respect to the rotation of the shaft.

28. In a glass machine, a mold arcuately movable in a predetermined path, elongated guide means for guiding glass into the mold from a point eccentric of the arcuate path, means supporting one end of the guide means adjacent said point against displacement, the other end being movable across the path of the mold, mechanism to move the mold and the said other end of the guide means in synchronism, including a movable driving element for moving the mold in its arcuate path, and another movable driving element movable separately from the mold for moving the said other end of the guide means across the path of the mold, and interconnections between the movable driving elements for operating them in synchronism.

SAMUEL E. WINDER.

REFERENCES CITED

The following references are of record in the file of this patent:

UNITED STATES PATENTS

| Number | Name | Date |
| --- | --- | --- |
| 1,660,125 | Hanford | Feb. 21, 1928 |
| 1,761,792 | Jaeger | June 3, 1930 |
| 1,843,160 | Ingle | Feb. 2, 1932 |
| 1,976,239 | Lorenz et al. | Oct. 9, 1934 |
| 2,038,519 | Barnard | Apr. 28, 1936 |
| 2,209,018 | Peiler | July 23, 1940 |